United States Patent
Levinger

(10) Patent No.: US 9,503,151 B2
(45) Date of Patent: Nov. 22, 2016

(54) IMPLICIT SWITCH FOR SWITCHING BETWEEN RECEIVE AND TRANSMIT MODES OF ANTENNAS

(71) Applicant: QUALCOMM INCORPORATED, San Diego, CA (US)

(72) Inventor: Tamir Levinger, Kiryat Mozkin (IL)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 14/206,891

(22) Filed: Mar. 12, 2014

(65) Prior Publication Data

US 2014/0273888 A1 Sep. 18, 2014

Related U.S. Application Data

(60) Provisional application No. 61/789,252, filed on Mar. 15, 2013.

(51) Int. Cl.
*H04B 1/44* (2006.01)
(52) U.S. Cl.
CPC .................. *H04B 1/44* (2013.01)
(58) Field of Classification Search
CPC .......................................... H04B 1/44
USPC ............................................................ 455/78
See application file for complete search history.

(56) References Cited

U.S. PATENT DOCUMENTS

| | | | |
|---|---|---|---|
| 9,166,640 B2 * | 10/2015 | Bakalski | |
| 2011/0076939 A1 * | 3/2011 | Sato | 455/39 |
| 2014/0187175 A1 * | 7/2014 | Zhao | H03F 1/0277 455/73 |

* cited by examiner

*Primary Examiner* — Eugene Yun

(57) ABSTRACT

A millimeter-wave radio frequency front-end circuit is provided. The front-end circuit comprises a millimeter-wave antenna configured to receive and transmit millimeter-wave signals; a matching network including at least a first inductor and a second inductor connected in parallel, wherein the matching network ensures impedance matching with the antenna when transmitting and receiving the millimeter wave signals; a power amplifier coupled to the antenna through the matching network; a low noise amplifier coupled to the antenna through the matching network, wherein the power amplifier is on and the low noise amplifier is off when transmitting the millimeter-wave signals, and the power amplifier is off and the low noise amplifier is on when receiving the millimeter-wave signals.

20 Claims, 4 Drawing Sheets

IMPLICIT SWITCH FOR SWITCHING BETWEEN RECEIVE AND TRANSMIT MODES OF ANTENNAS

CROSS-REFERENCE TO RELATED APPLICATIONS

This application claims the benefit of U.S. provisional application No. 61/789,252 filed on Mar. 15, 2013, the contents of which are herein incorporated by reference.

TECHNICAL FIELD

The present invention generally relates to millimeter wave radio frequency (RF) systems, and more particularly to a circuit that enables switching between transmit and receive millimeter wave antennas without a switch device.

BACKGROUND

The 60 GHz band is an unlicensed band which features a large amount of bandwidth and a large worldwide overlap. The large bandwidth means that a very high volume of information can be transmitted wirelessly. As a result, multiple applications, each requiring transmission of large amounts of data, can be developed to allow wireless communication around the 60 GHz band. Examples for such applications include, but are not limited to, wireless high definition TV (HDTV), wireless docking stations, wireless Gigabit Ethernet, and many others. The IEEE 802.11ad (WiGig) standard is one of the communication standards defined to enable multi-Gb/s wireless communication by utilizing the 60 GHz frequency band and antenna arrays.

In order to facilitate such applications in computing devices, such as laptop computers, smart phones, tablet computers, etc. there is a need to develop integrated circuits (ICs), such as amplifiers, mixers, radio frequency (RF) analog circuits, and active antennas that operate in the 60 GHz frequency range. An RF system typically comprises active and passive modules. The active modules (e.g., a phased array antenna) require control and power signals for their operation, which are not required by passive modules (e.g., filters). The various modules are fabricated and packaged as radio frequency integrated circuits (RFICs) that can be assembled on a printed circuit board (PCB). The size of the RFIC package may range from several to a few hundred square millimeters.

In the consumer electronics market, the design of electronic devices, and thus RF modules integrated therein, should meet the constraints of minimum cost, size, power consumption, and weight. The design of the RF modules should also take into consideration the current assembled configuration of electronic devices, and particularly handheld devices, such as laptop and tablet computers, in order to enable efficient transmission and reception of millimeter wave signals. Furthermore, the design of the RF module should account for minimal power loss of receive and transmit RF signals and for maximum radio coverage.

A typical RF module that operates in the 60 GHz frequency band is designed for transmission and reception of millimeter-wave signals. The RF module includes an array of active antennas connected to a RF circuitry or an IC. Each antenna in the array of antennas may operate as a transmit (TX) and/or receive (RX) antenna.

Specifically, as illustrated in FIG. 1, a millimeter wave antenna 110 is connected through a switch 120 to a power amplifier (PA) 130 and a low noise amplifier (LNA) 140. The PA 130 amplifies transmit signals while the LNA 140 amplifies receive signals. The switch 120 is a single pole, double throw (SPDT) switch. A chip interface (bump') 150 is an interface point between a board's integrated circuit (e.g., a PCB) and the antenna 110. The control of the switch 120 determines if the antenna 110 is in a transmit mode or a receive mode by a control signal 125 typically provided by a baseband module (not shown). To allow a proper operation of the RF module both the PA 130 and the LNA 140 require a matching network at the chip interface 150.

Although sharing the antennas between transmit (TX) and receive (RX) modes allows reducing the number of required antennas and antenna connections by half, and enables RX/TX reciprocity, still such a design requires an additional SPDT switch to be coupled to each antenna. For an array of antennas including N antennas (N>1), there are N switches.

For consumer electronic devices, such as those described above, there is a significant need to reduce the integrated circuit's area in order to reduce cost and enable a compact solution. Therefore, additional SPDT switches in the RF module increase the total area of the IC and its power consumption. Furthermore, to maximize radio performance, the connection to the antenna needs to introduce minimal signal losses. Thus, directly coupling the antenna to the PA and LNA would introduce significant losses due to lack of proper impedance matching. Furthermore, any design of coupling the antenna to the PA and LNA should meet the constraints which necessitate that the physical dimensions, the power consumption, heat transfer, and cost should be as minimal as possible.

It would be therefore advantageous to provide an efficient IC layout design for an antenna array connectivity that overcomes the disadvantages of conventional layout design.

SUMMARY

Certain embodiments disclosed herein include a millimeter-wave radio frequency front-end circuit. The front-end circuit comprises a millimeter-wave antenna configured to receive and transmit millimeter-wave signals; a matching network including at least a first inductor and a second inductor connected in parallel, wherein the matching network ensures impedance matching with the antenna when transmitting and receiving the millimeter wave signals; a power amplifier coupled to the antenna through the matching network; a low noise amplifier coupled to the antenna through the matching network, wherein the power amplifier is on and the low noise amplifier is off when transmitting the millimeter-wave signals, and the power amplifier is off and the low noise amplifier is on when receiving the millimeter-wave signals.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
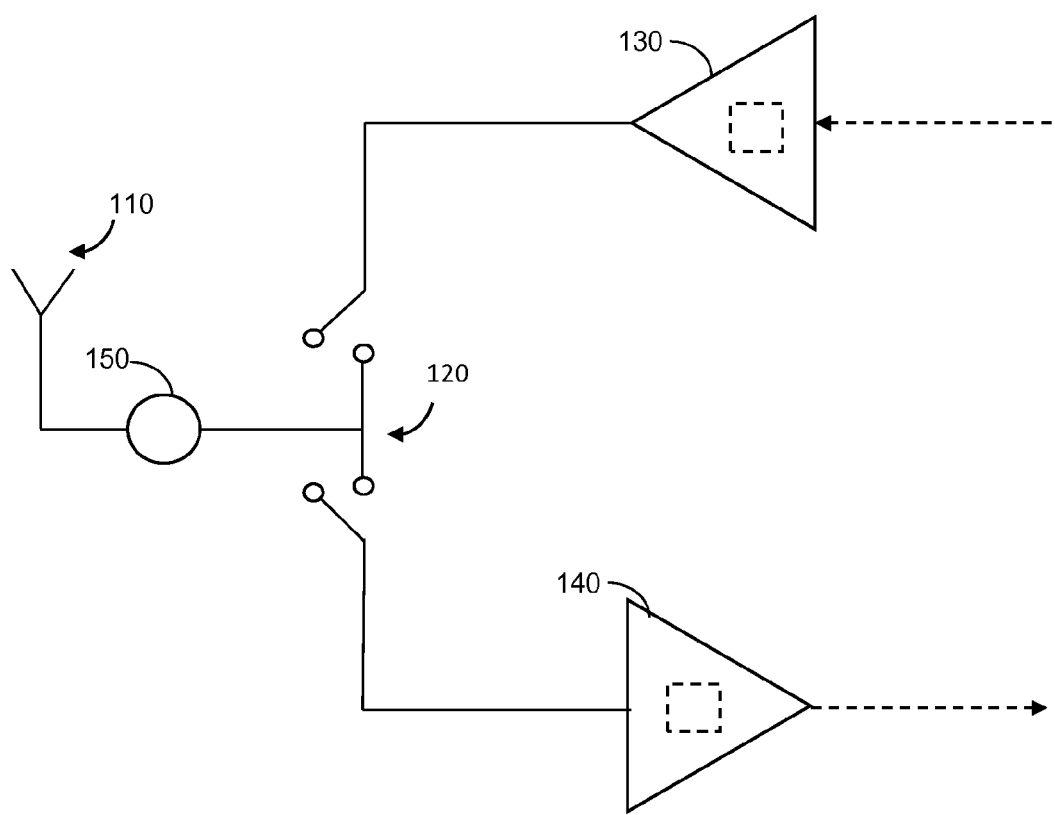
FIG. 1 is a schematic diagram of a typical RFIC design including an explicit transmit/receive switch.

The embodiments disclosed are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

According to various embodiments disclosed herein a radio frequency (RF) module is designed to provide a switching function between transmit and receive modes without having an explicit switch, such as a SPDT switch coupled to a antenna. The design provides the required impedance matching to the power amplifier and low noise amplifier, thereby reducing the area of the RF module (RFIC) and signal losses.

Figure 2:
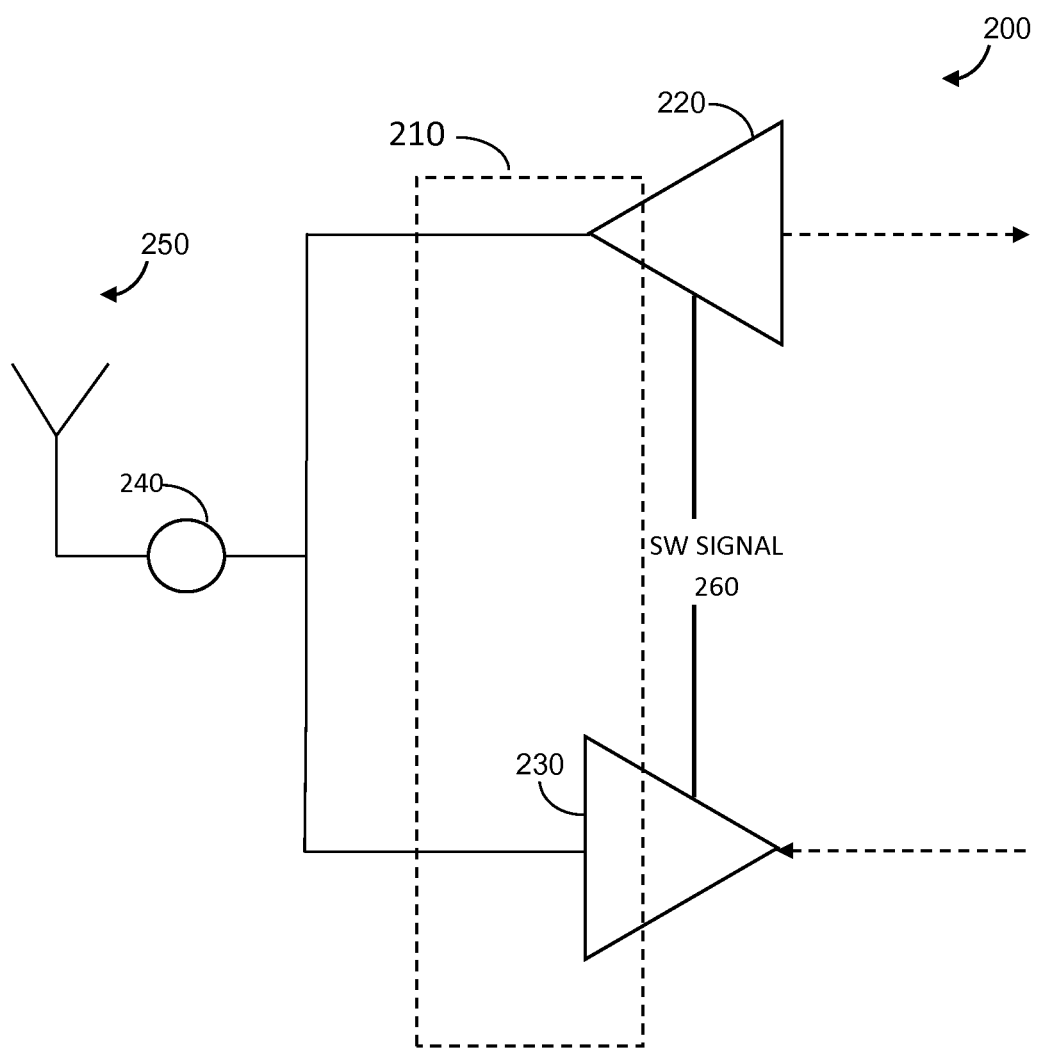
FIG. 2 is diagram of a RF front-end design implementing the switching function according to one embodiment.

FIG. 2 is a schematic diagram of a RF front-end 200 designed according to one embodiment. The RF front-end 200 includes a matching network 210 shared between a power amplifier (PA) 220 and a low noise amplifier (LNA) 230. The power amplifier 220 amplifies the transmit signal while the low noise amplifier 230 amplifies receive signals. In an embodiment, receive and transmit signals are millimeter wave signals of a 60 GHz frequency band.

As will be discussed in detail below, the matching network 210 impedance matches both the power amplifier 220 and the low noise amplifier 230 with a chip interface (bump) 240. An antenna 250 is directly coupled to the chip interface 240. The antenna 250 is a millimeter wave antenna configured to receive and transmit signals at the 60 GHz frequency band. In an embodiment, the antenna 250 is part of an array of active antennas that can be controlled to receive/transmit radio signals in a certain direction, to perform beam forming, and for switching from receive to transmit modes. For example, an active antenna may be a phased array antenna in which each radiating element (e.g., antenna 250) can be controlled individually to enable the usage of beam-forming techniques.

According to the disclosed embodiment, the switching between a transmit mode and a receive mode is achieved by turning on and off the respective amplifier. That is, in a transmit mode, the power amplifier 220 is on, while the low noise amplifier 230 is off. In the receive mode, the power amplifier 220 is off, while the low noise amplifier 230 is on. Switching the amplifiers 220 and 230 between on and off states is performed under the control of a switching signal 260 directly connected to the amplifiers 220 and 230. The switching signal may be generated by a baseband module (not shown).

Figure 3:
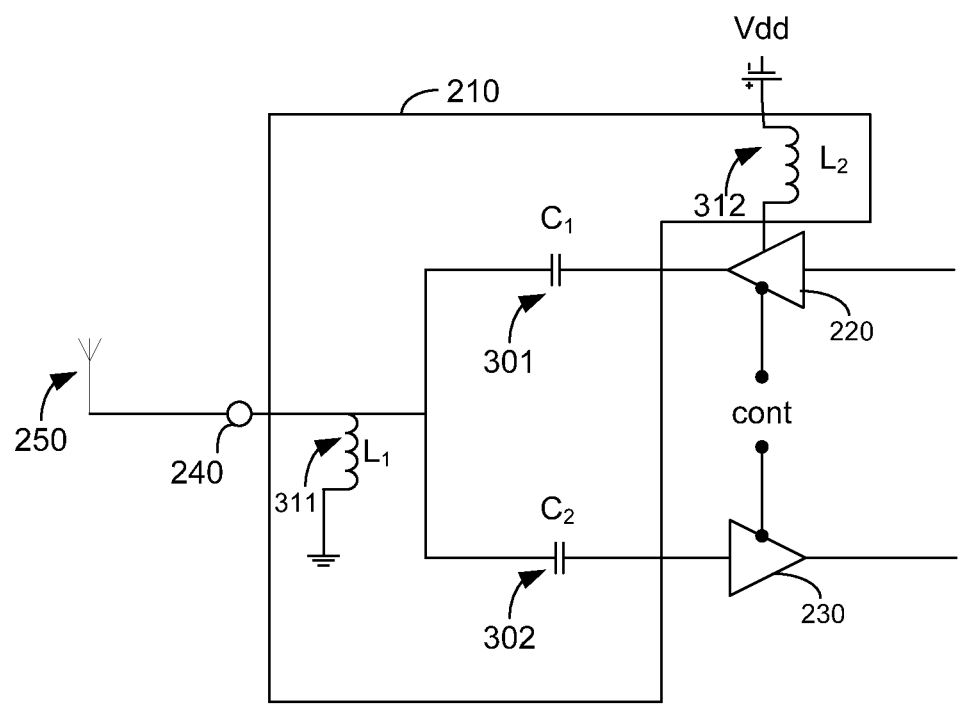
FIG. 3 is a diagram of a matching network design function according to one embodiment.

FIG. 3 shows a schematic diagram of the matching network 210 designed according to the disclosed embodiments. The shared matching network 210 includes capacitors 301 and 302 that are closed to be a serial short, and thus have a negligible effect at the 60 GHz frequency band. The matching network 210 also includes parallel inductors 311 and 312 for resonating all capacitance of the power amplifier 220 and low noise power amplifier 230.

Figure 4:
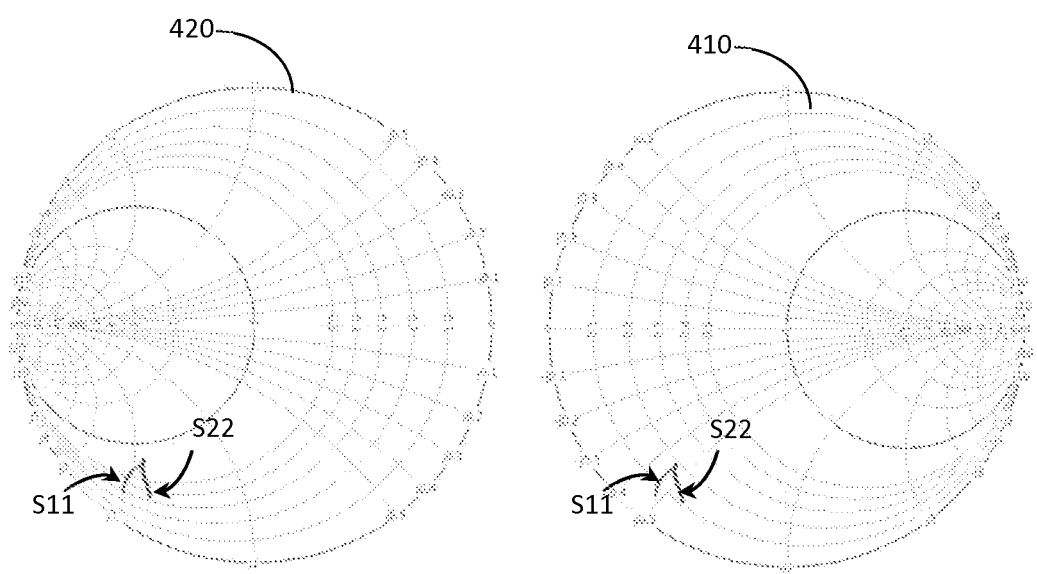
FIG. 4 shows exemplary admittance and impedance smith charts respectively simulating the impedance and capacitance of the amplifiers.

According to an embodiment, when the power amplifier 220 is on, it introduces parallel capacitance to the ground. The inductors 311 and 312 resonate this capacitance as well as the residual capacitance of the low noise amplifier 230 which is off. The series capacitors 301 and 302 are substantially short in the frequency of operation. In a similar fashion, when the low noise amplifier 230 is on, it introduces parallel capacitance to the ground. The inductors 311 and 312 resonate this capacitance as well as the residual capacitance of the power amplifier 220 which is off. The series capacitors 301 and 302 are substantially short in the operation frequency. This achieves substantially 50Ω impedance termination value at the chip interface 240, due to the transistors realizing amplifiers 230 and 240 real part value as demonstrated, for example, in the smith chart diagrams 410 and 420 (FIG. 4).

In one embodiment, the inductor 311 is a miniaturized electrostatic discharge (ESD) inductor which is part of an ESD protection circuit. The ESD is designed for millimeter wave electrical elements. In an embodiment, the ESD protection circuit is fabricated on a multilayer substrate and includes a metal line being connected at one end to a ground and at another end to a connective strip, where a length of the metal line is a maximum length that achieves a resistance value defined for the ESD protection circuit and a width of the metal line is set to a maximum width allowed for the multilayer substrate, wherein the metal line introduces a inductance value into the ESD protection circuit, and a capacitor being connected in parallel to the metal line and having a capacitance value resonating the metal line at an operating frequency band. The ESD protection circuit shunts ESD pulses to the ground and passes signals at the operating frequency band. An exemplary implementation to the ESD inductor is also described in U.S. Pat. No. 8,504,952 to Yehezkely, which is assigned to common assignee, and is incorporated hereby by reference for all that it contains.

It should be noted that the parallel inductors 311, 312, are designed to resonate the capacitance of power and low noise amplifiers. Thus, even with the amplifiers 220, 230 capacitively loading each other, a 1 dB bandwidth of the resonant matching network is 11 GHz. In an embodiment, a transistor of the low noise amplifier 230 is selected in such way that the gate-drain stress is low enough to require no additional isolation. In one embodiment, an inductor 311 (realized as ESD inductor) is placed inside the ground plane region that is part of the chip-package transition. Using the design disclosed herein the total loss from the amplifiers to the on-package transmission lines that route to the antenna is less than 0.5 dB.

FIGS. 4A and 4B respectively show an impedance smith chart 410 and an admittance smith chart 420 produced for the front end transistors that are used to implement the amplifiers illustrated in FIG. 3. Both the impedance and admittance charts 410 and 420 show the reflection coefficients of the amplifiers (transistors) 220 and 230. Specifically, S22 represents that the power amplifier is on and the low noise amplifier is off, i.e., operating in a transmit mode, and S11 represents that the power amplifier is off and the low noise amplifier is on, i.e., operating in a receive mode.

As can be noticed from the smith charts, when using matching network 210, S22 (transmit) and S11 (receive) are close to each other. Moreover, a person skilled in the art would appreciate that the impedance (chart 420) of the amplifiers in the different modes of operations can be brought to be closed to 50Ω via a parallel inductor used as a matching network.

The reflections S11 and S22 shown in the admittance smith chart 420 are related to the parallel capacitance of the amplifiers 220 and 230 in the transmit and receive modes.

The parallel inductors (311, 312 of FIG. 3) at their resonance frequency cancel the parallel capacitance of the amplifiers 220 and 230.

Therefore, the matching network 210 with the right selection inductance for the parallel inductors (as in the above example) would provide substantially 50Ω both at the amplifiers 220 and 230 both in the transmit and receive modes.

From calculation of the total parallel capacitance to the ground (C), while the power amplifier is 'on' and the low noise amplifier is 'off' it can be concluded that:

C=110 fF, where C is the total capacitance from the active and power down amplifier transistors.

The resonance equation from which the required inductance is determined is defined as follows:

$$\frac{1}{LC} = 2\pi f$$

where 'f' is the operating frequency, e.g., 60 GHz.

The total inductance L is implemented via two inductors in parallel. In an embodiment, L1 is an EDS inductor having low DC resistance. In exemplary implementation, L2=85 pH, therefore L2 equals to 259 pHy.

It is important to note that these embodiments are only examples of the many advantageous uses of the innovative teachings herein. Specifically, the innovative teachings disclosed herein can be adapted in any type of consumer electronic device where reception and transmission of millimeter wave signals is needed. Moreover, some statements may apply to some inventive features but not to others. In general, unless otherwise indicated, it is to be understood that singular elements may be in plural and vice versa with no loss of generality.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An apparatus, comprising:
   an antenna configured to receive and transmit signals;
   a matching network including at least a first inductor and a second inductor connected in parallel, wherein the matching network is configured for impedance matching with the antenna if transmitting and receiving the signals;
   a first amplifier coupled to the antenna through the matching network; and
   a second amplifier coupled to the antenna through the matching network, wherein the first amplifier is on and the second amplifier is off if transmitting the signals, and the first amplifier is off and the second amplifier is on if receiving the signals, wherein the first amplifier and the second amplifier are switched between on and off states via a switching signal provided to the first amplifier and the second amplifier, wherein the first inductor is coupled between the antenna and a reference potential for the apparatus, and the second inductor is coupled between the first amplifier and a voltage supply for the first amplifier.

2. The apparatus of claim 1, further comprising:
   a board comprising at least the matching network; and
   a chip interface that serves as a coupling connection between the antenna and the board.

3. The apparatus of claim 1, wherein the matching network further comprises:
   a first capacitor having a first terminal coupled to an output of the second amplifier, and
   a second capacitor having a first terminal coupled to an output of the first amplifier, wherein a second terminal of the first capacitor and the second capacitor are coupled to the first inductor,
   wherein values of the first and second capacitors are designed such that the first and second capacitors operate as a short circuit at a frequency band of the signals.

4. The apparatus of claim 1, wherein:
   the matching network resonates a capacitance of the first amplifier if the first amplifier is on and a capacitance of the second amplifier if the second amplifier is off.

5. The apparatus of claim 1, wherein:
   the matching network resonates a capacitance of the second amplifier if the second amplifier is on and a capacitance of the first amplifier if the first amplifier is off.

6. The apparatus of claim 1, further comprising an electrostatic discharge (ESD) circuit that includes the first inductor.

7. The apparatus of claim 1, further comprising a baseband module configured to generate the switching signal to switch the second amplifier and the first amplifier between off and on states.

8. The apparatus of claim 1, wherein an output of the first amplifier remains electrically coupled with an input of the second amplifier if transmitting and receiving signals.

9. A circuit, comprising:
   a matching network including at least a first inductor and a second inductor connected in parallel, wherein the matching network is configured for impedance matching with an antenna if transmitting and receiving signals;
   a first amplifier coupled to an interface for connecting to the antenna through the matching network; and
   a second amplifier coupled to the interface for connecting to the antenna through the matching network, wherein the first amplifier is on and the second amplifier is off if transmitting the signals, and the first amplifier is off and the second amplifier is on if receiving the signals, wherein the first amplifier and the second amplifier are switched between on and off states via a switching signal provided to the first amplifier and the second amplifier, wherein the first inductor is coupled between the interface for connecting to the antenna, and a reference potential for the circuit, and wherein the second inductor is coupled between the first amplifier and a voltage supply node for the first amplifier.

10. The circuit of claim 9, wherein the matching network further comprises:
    a first capacitor having a first terminal coupled to an output of the second amplifier, and a second capacitor having a first terminal coupled to an output of the first amplifier, wherein the first capacitor and second capacitor are coupled to the first inductor, wherein values of the first and the second capacitors are designed such that the first and second capacitors operate as a short circuit at a frequency band of the signals.

11. The circuit of claim 9, wherein the matching network resonates a capacitance of the first amplifier if the first amplifier is on and a capacitance of the second amplifier if the second amplifier is off.

12. The circuit of claim 9, wherein the matching network resonates a capacitance of the second amplifier if the second amplifier is on and a capacitance of the first amplifier if the first amplifier is off.

13. The circuit of claim 9, further comprising an electrostatic discharge (ESD) circuit including the first inductor.

14. The circuit of claim 9, further comprising:
an interface to receive the switching signal to switch the second amplifier and the first amplifier between off and on states.

15. An electronic device, comprising:
at least one antenna for transmitting and receiving signals;
a matching network including at least a first inductor and a second inductor connected in parallel, wherein the matching network is configured for impedance matching with the at least one antenna if transmitting and receiving the signals;
a first amplifier coupled to the at least one antenna through the matching network;
a second amplifier coupled to the at least one antenna through the matching network; and
a baseband module configured to generate a switching signal provided to the first amplifier and the second amplifier, wherein the switching signal switches the first amplifier on and the second amplifier off if transmitting the signals and switches the first amplifier off and the second amplifier on if receiving the signals, wherein the first inductor is coupled between the at least one antenna and a reference potential for the electronic device, and the second inductor is coupled between the first amplifier and a voltage supply for the first amplifier.

16. The electronic device of claim 15, wherein the matching network further comprises:
a first capacitor having a first terminal coupled to an output of the second amplifier, and
a second capacitor having a first terminal coupled to an output of the first amplifier, wherein the first capacitor and second capacitor are coupled to the first inductor,
wherein values of the first and second capacitors are designed such that the first and second capacitors operate as a short circuit at a frequency band of the signals.

17. The electronic device of claim 15, wherein the matching network resonates the capacitance of the first amplifier if the first amplifier is on and a capacitance of the second amplifier if the second amplifier is off.

18. The electronic device of claim 15, wherein the matching network resonates a capacitance of the second amplifier if the second amplifier is on and a capacitance of the first amplifier if the first amplifier is off.

19. The electronic device of claim 15, further comprising an electrostatic discharge (ESD) circuit including the first inductor.

20. The electronic device of claim 15, further comprising an active antenna array that includes the at least one antenna.

* * * * *